US005557643A

United States Patent [19]
Kim et al.

[11] Patent Number: 5,557,643
[45] Date of Patent: Sep. 17, 1996

[54] AUTOMATIC FREQUENCY CONTROL SYSTEM FOR GMSK-MODULATED SIGNALS

[75] Inventors: In-Kyung Kim, N. Potomac, Md.; Zhendong Cao, Matawan, N.J.

[73] Assignee: Hughes Electronics, Los Angeles, Calif.

[21] Appl. No.: 418,807

[22] Filed: Apr. 7, 1995

[51] Int. Cl.⁶ .................................................. H04L 27/14
[52] U.S. Cl. ..................... 375/324; 375/274; 375/336; 375/344; 329/300; 329/318; 348/536; 331/34
[58] Field of Search ...................... 375/344, 271, 375/274, 324, 334, 336; 331/34, 1 R; 455/75, 164.1, 182.2, 192.2; 329/300, 304, 315, 318, 320; 348/536

[56] References Cited

U.S. PATENT DOCUMENTS

| | | |
|---|---|---|
| 4,887,050 | 12/1989 | Borth et al. ............................... 331/34 |
| 5,131,008 | 7/1992 | Kazecki et al. .......................... 375/344 |
| 5,341,402 | 8/1994 | Matsushita et al. ..................... 375/344 |
| 5,412,693 | 5/1995 | Bolla et al. .............................. 375/326 |
| 5,440,268 | 8/1995 | Taga et al. ............................... 329/308 |

*Primary Examiner*—Stephen Chin
*Assistant Examiner*—Amanda T. Le
*Attorney, Agent, or Firm*—Gordon R. Lindeen, III; Wanda K. Denson-Low

[57] ABSTRACT

An AFC system and method of detecting and compensating frequency drift in the carrier frequency of a Gaussian filtered Minimum Shift Keying (GMSK) signal by demodulated frequency compensated samples of the received signal and calculating a frequency compensation angle based upon the demodulated frequency compensation samples. The compensation angle is fed back to the frequency compensator and error detector and used to calculate the error signal.

25 Claims, 3 Drawing Sheets

AUTOMATIC FREQUENCY CONTROL SYSTEM FOR GMSK-MODULATED SIGNALS

BACKGROUND OF THE INVENTION

One form of a modulation employed for digital data transmission is Gaussian Minimum Shift Keying (GMSK). In the transmitter a premodulation Gaussian low pass filter (LPF) is used. The Gaussian LPF inherently creates inter-symbol-interferences (ISI) in the modulated signal. Thus, unlike a minimum shift keying (MSK) modulated signal, the phase of the GMSK modulated signal does not fully change to $+\pi/2$ in response to each bit. Instead, the actual phase change for each bit is less than or equal to $\pi/2$ and is a function of bit pattern and the BT product of the Gaussian LPF, where B is the band width of the LPF and T is the bit time interval.

Often frequency drifts in the carrier frequency are introduced in the transmitted modulated signal by hardware imperfections in the carrier frequency generation circuitry. Also, variations in vehicle speed can cause additional frequency drifts in the received signal. Automatic frequency control (AFC) systems have been used to track slow frequency drifts in the modulated signal. Typically, AFC systems rely on an error signal generated in a feedback control loop, the error signal ideally representing frequency tracking error.

One known prior art AFC system employs a frequency compensator and error detector with a loop filter in the feedback loop of the frequency compensator and error detector. The error detector estimates the frequency error or offset of the frequency compensated received signal. The loop filter accumulates or integrates the output of the error detector to smooth out noise for the frequency compensator. The frequency compensator compensates the frequency offset of the received signal by an amount proportional to the output of the loop filter.

AFC systems have been developed for various modulation schemes such as binary phase shift keying (BPSK), quadrative-phase shift keying (QPSK) and multiple frequency shift keying (MFSK). The different systems are implemented predominantly in the error detector block depending upon the modulation format of the received signal. Unfortunately, none of these known systems can be used with a GMSK-modulated signal because of the inherent ISI of the GMSK-modulated signal. For example, if an error detector of an AFC system designed for use with a QPSK-modulated signal is used in conjunction with a GMSK-modulated signal, the output of the error detector would be very noisy resulting in a poor AFC performance. This is because the data modulation effects cannot be removed from the error detector output signal due to the ISI affecting the signal phase diagram.

Thus, it is desirable to provide an AFC system for a GMSK-modulated signal in which a reliable error signal is generated thereby improving the overall performance of the AFC system.

It is also desirable to provide a reliable AFC system using inexpensive hardware.

SUMMARY OF THE INVENTION

According to a first aspect of the present invention, a method of detecting and compensating for frequency drift in the carrier frequency of a Gaussian filtered Minimum Shift Keying (GMSK) signal is provided. The method includes the steps of providing a bit parameter, providing a loop filter having at least two parameters and setting the bit parameter equal to zero and initializing the loop parameters. Then samples of a bit of a GMSK signal are received and frequency compensated samples are computed from the samples of the GMSK signal and the loop filter parameters initialized above. Next, the frequency compensated samples are demodulated to provide a particular demodulated bit pattern and a frequency compensation angle is completed for a particular demodulated bit pattern. An error signal is then computed from the frequency compensated samples calculated and the particular compensation angle determined above. The parameter values of the loop filter are then recalculated from the error signal calculated and the loop filter parameter values determined in the previous step are feed back to compute frequency compensated samples.

According to a second aspect of the present invention, an AFC system for detecting and compensating for frequency drift in the carrier frequency of a Gaussian filtered Minimum Shift Keying (GMSK) signal is provided. The system includes an error detector and frequency compensator which receives samples of the GMSK signal and computes an error signal and frequency compensated samples. Also a loop filter is provided in the feed back path of the error detector and frequency compensator. The loop filter receives the output of the error detector and frequency compensator and computes a filter parameter from the error signal and feeds back the filter parameter to the error detector and frequency compensator in a first feedback loop. A demodulator receives the output of the error detector and frequency compensator and computes demodulated frequency compensated samples. A frequency compensation table receives the demodulated frequency compensated samples and computes a frequency compensation angle and feeds back the frequency compensation angle to the error detector and frequency compensator in a second feed back loop. The error detector then computes the error signal from the frequency compensated samples and the frequency compensation angle.

The invention itself, together with further objects and attendant advantages, will best be understood by reference to the following detailed description, taken in conjunction with the accompanying drawings.

DETAILED DESCRIPTION OF THE DRAWINGS

Figure 1:
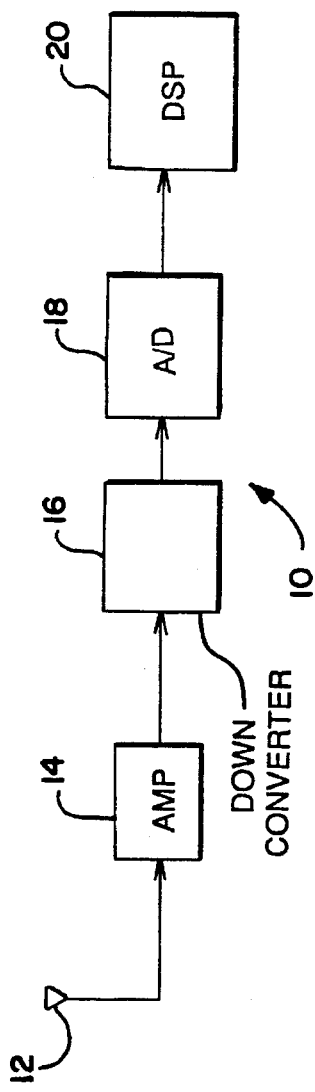
FIG. 1 is a block diagram of a receiver according to a preferred embodiment of the present invention.

FIG. 1 is a block diagram of a receiver 10 according to a preferred embodiment of the present invention. The receiver 10 includes an antenna 12, a front end amplifier 14, a down converter 16, an analog-to-digital (A/D) converter 18 and a digital signal processor (DSP) 20. The antenna 12 is coupled to the input of the front end amplifier 14. The output of the amplifier 14 is coupled to the input of the down converter 16. The output of the down converter 16 is coupled to the input of A/D converter 18 and the output of A/D converter 18 is coupled to the input of DSP 20.

The antenna 12 receives a transmitted GMSK-modulated signal. In a preferred embodiment, the receiver 10 forms part of a base station (not shown) used in an overlay system known as the Cellular Digital Packet Data (CDPD) system. The CDPD system utilizes the structure of an existing cellular system to provide mobile datagram service. In particular, the CPDP system utilizes idle or unused channels to transmit bursts of data. A consortium of cellular communication carriers prepared and released in 1993 a specification entitled "Cellular Digital Packet Data System Specification." The specification defines a protocol to be used by the industry for transmitting and receiving data messages over an existing cellular communication system. A plurality of remote subscriber units transmit GMSK modulated signals which are received by a receiver 10 of a base station and routed to the appropriate location. In order for the receiver 10 to properly demodulate the received signal it must keep track of any frequency drifts in the carrier frequency of the transmitted signal.

The signal received by antenna 12 is first amplified by amplifier 14 and then converted to a base band signal by downconverter 16, i.e., the carrier frequency is removed. The base band signal is then converted to a digital signal by A/D converter 18. The output signal of the A/D converter 18 which will be referred to as $Z_r(k)$ is sent to DSP 20. In a preferred embodiment DSP 20 is a Texas Instrument C51 family processor.

Thus, in general an AFC system is used in the CDPD base station demodulator to track slow frequency drifts in the receiver carrier frequency. The basic functions of the AFC system is to (1) estimate the frequency drifts of the carrier frequency and (2) correct or compensate such frequency drift based on the estimation so that the performance loss of the GMSK-demodulator due to frequency drift is minimized.

As was previously described, prior art AFC systems are implemented in the form of a feedback loop. Typically in such AFC systems the frequency error signal is generated by a frequency error detector and a signal frequency is compensated according to the filtered or accumulated error signal.

Figure 2:
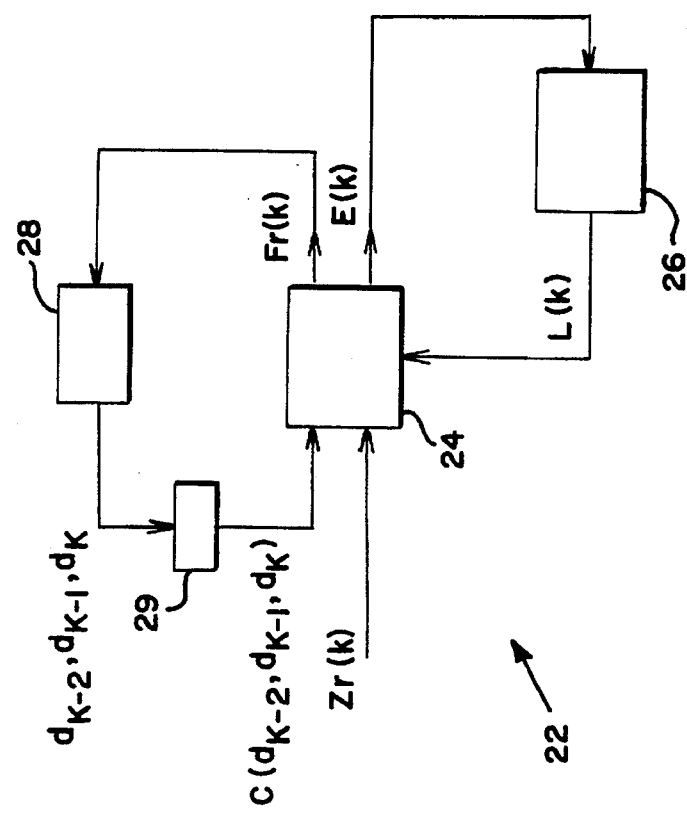
FIG. 2 is a block diagram of the AFC system according to a preferred embodiment of the present invention.

FIG. 2 is a block diagram of an AFC system 22 according to a preferred embodiment of the present invention. In a preferred embodiment the AFC system 22 is implemented in firmware, i.e., programming DSP 20 to perform particular operations as will be described in greater detail hereinafter. Alternatively, the AFC system 22 can be implemented in hardware, for example, ASIC (Application Specific Integrated Circuit) may be used, however, there are numerous other ways to implement the AFC system of the present invention, as those skilled in the art will appreciate.

The AFC system 22 includes a frequency compensation and error detection block 24, a loop filter block 26, a demodulator block 18 and an angle compensation table block 29. Because the AFC system 22 is preferably implemented in firmware, the term "block" is used to distinguish the AFC system 22 from a hardware implementation. The loop filter 26 is provided in a first feedback loop and the demodulator block 28 and angle compensation table block 29 are provided in a second feedback loop. The frequency compensation and error detection block 24 receives the sampled signal $Z_r(k)$ from A/D converter 18 and stores those samples in a memory or register (not shown). The frequency compensation and error detection block 24 also receives the outputs from the loop filter block 26 designated L(k) and the angle compensation table block 29 designated $C(d_{k-2}, d_{k-1}, d_k)$ which will be described in greater detail hereinafter. A first output of the frequency compensator and error detector block 24 is coupled to the loop filter block 26 in a first feed back loop. More particularly, the first output of the frequency compensator and error detector is an error signal. A second output of the frequency compensator and error detector block 24 is coupled to the demodulator block 28. More particularly, the second output of the frequency compensator and error detector block 24 are frequency compensated samples of the received signal. The demodulator 28 demodulates the frequency compensated samples and outputs a demodulated signal to the angle compensation table block 29. The angle compensation table block 29 outputs a frequency compensation angle to the frequency compensator and error detector block 24, the frequency compensation angle being dependent upon the output of the demodulator block 28.

In a first preferred embodiment, the frequency compensation and error detection block 24 outputs frequency compensated samples $F_r(k)$ to the demodulator 28 and an error signal E(k) to the loop filter block 26. In this first preferred embodiment the error signal E(k) is estimated using the unfiltered baseband signal, i.e., directly on $Z_r(k)$. The operation of the AFC system 22 according to this first preferred embodiment will be described with reference to the flow chart illustrated in FIG. 3. In another preferred embodiment to be described with respect to the flow chart of FIG. 4, the error signal E(k) is estimated using a filtered version of $Z_r(k)$.

With reference to the flow chart of FIG. 3 and the block diagram of FIG. 2 the operation of the AFC system 22 will be described. As previously described, AFC system 22 is implemented in DSP 20. In the first step 100, the frequency compensator and error detector 24 initializes the parameters R(k) and L(k) for the first bit interval (k=0) as follows, R(−1)=L(−1)=0. Next in step 102, samples of the received signal $Z_r(k)$ are read from memory for the kth bit starting with k=0. The output of step 102 is defined as $Z_r(Nk+l)$, where l=0, ..., N−1 and N is the number of samples per bit. In a preferred embodiment the sampling rate is four samples per bit interval (i.e., N=4). Thus for each bit, four values of $Z_r(k)$ are read.

Next, in step 104 frequency compensated samples for the kth bit interval are calculated using the samples $Z_r(Nk+l)$. In particular, the frequency compensated samples for the kth bit, $F_r(Nk+l)$ may be defined by equation (1) below:

$$F_r(Nk+1) = Z_r(Nk+1)\exp\left[-j\sum_{m=0}^{k-1}L(m) + L(k-1)\frac{l}{N}\right]; \quad (1)$$

where l=0, ..., N−1 and L(m) is the loop filter output for the mth bit (i.e., the accumulated error for the previous bit intervals) and L(k-1) is the loop filter output for the (k-1)st bit.

The frequency compensated samples are then sent to the demodulator block 28 in step 106. The demodulator 28 in step 108 demodulates the kth bit to give a value $d_k$. The demodulated kth bit, $d_k$, along with the two previously demodulated bits, $d_{k-1}$ and $d_{k-2}$ are sent to angle compensation table block 29 in step 110. The compensated angle table block 29 stores a frequency compensation table. The table is used to look up a frequency compensation angle based upon the output of the demodulator 28. In particular, the frequency compensation table, see Table 1 below, provides a particular compensation angle $C(d_{k-2}, d_{k-1}, d_k)$ in radians dependent upon the demodulated bit values, $d_{k-2}$, $d_{k-1}$ and $d_k$.

TABLE 1

| $d_{k-2}, d_{k-1}, d_k$ | $C(d_{k-2}, d_{k-1}, d_k)$ |
|---|---|
| 000 | −1.57 |
| 001 | −1.24 |
| 010 | 0.907 |
| 011 | 1.24 |
| 100 | −1.24 |
| 101 | −0.907 |
| 110 | 1.24 |
| 111 | 1.57 |

The compensation angle $C(d_{k-2}, d_{k-1}, d_k)$ may be changed depending on the front-end hardware filter group delay characteristics in the down converter block 16 and A/D converter block 18.

Next in step 112 the frequency compensator and error detector block 24 computes an error signal E(k) using the frequency compensated samples and the compensation angle determined in steps 104 and 110 respectively. In particular, the error signal E(k) may be defined by equation (2) below:

$$E(k-1) = Imag[F_r(Nk)F_r^*N(k-1)exp\{-jC(d_{k-2}, d_{k-1}, d_k)\}] \quad (2)$$

where $F_r(Nk)$ is the frequency compensated sample for the (k-1)st bit and $F_r^*(N(k-1))$ is the complex conjugate of the frequency compensated sample for the (k-2)st bit.

Next, in step 114 the loop filter block 26 updates the loop filter values R(k) and L(k) using the error value E(k-1) determined in block 112 according to:

$$R(k) = L(k-1) + C_2 E(k-1) \quad L(k) = L(k-1) + R(k) C_1 E(k-1)$$

where R(k) is a dummy variable and L(k) is the output of the loop filter. The parameters $C_1$ and $C_2$ are constants which control the loop band width and tracking speed. In a preferred embodiment $C_1 = 0.0399$ and $C_2 = 0.0001$. The loop filter value L(k) is then delayed by 1 bit in step 118 to be used by the frequency compensator and error detector 24 in step 104 to calculate the frequency compensated samples. In step 116 it is determined whether the last bit of the received signal has been read in step 102. If not, the bit interval is incremented by one in step 120 and then the entire process is repeated starting at step 102. If the last bit has been processed, the program is ended.

In a second preferred embodiment the frequency samples are first passed through a MSK-matched filter. This preferred embodiment will be described in conjunction with the flow chart shown in FIG. 4. As was already described with reference to the flow chart of FIG. 3, the parameters of the loop filter are initialized in step 100 and samples of the received signal are read in step 102. Then in step 104, frequency compensated samples using the received signal samples are calculated. The frequency compensated samples are sent to the demodulator and as previously described the demodulated bit along with the two previously demodulated bits are used to find a compensation angle in step 110. For this preferred embodiment the frequency compensation table of step 110 is defined by Table 2 below.

TABLE 2

| $d_{k-2}, d_{k-1}, d_k$ | $C(d_{k-2}, d_{k-1}, d_k)$ |
|---|---|
| 000 | 0 |
| 001 | −0.63 |

TABLE 2-continued

| $d_{k-2}, d_{k-1}, d_k$ | $C(d_{k-2}, d_{k-1}, d_k)$ |
|---|---|
| 010 | 1.26 |
| 011 | 0.63 |
| 100 | −0.63 |
| 101 | −1.26 |
| 110 | 0.63 |
| 111 | 0 |

The frequency compensated samples are also sent to a matched filter in step 210. The matched filter output for the kth bit, M(k) is defined by equation (3) below:

$$M(k) = \sum_{l=0}^{2N-1} F_r(Nk+l) \sin\left(\frac{2\pi l}{4N}\right). \quad (3)$$

The matched filter output M(k) is then sent to block 212 where a state decision is made on M(k). In particular, the state decision for the kth bit, $S_k$, is defined as follows:

for even k,
$$S_k = \begin{cases} 1 & \text{if dist}(1, M(k)) < \text{dist}(-1, M(k)) \\ -1 & \text{otherwise} \end{cases}$$

for odd k,
$$S_k = \begin{cases} -j & \text{if dist}(j, M(k)) < \text{dist}(-j, M(k)) \\ j & \text{otherwise} \end{cases} ;$$

where dist. (a, b) measures the distance between a and b. The state decision $S_k$ is based on the demodulator assuming 4-phase state but the principle remains the same for other demodulator types.

The error signal E(k-1) is then computed in step 112 using the matched filter outputs M(k-1) and M(k-2), the angle compensation $C(d_{k-2}, d_{k-1}, d_k)$ and the state decisions $S_{k-1}$ and $S_{k-2}$. In particular, error signal E(k-1) may be defined by equation (4) below:

$$E(k-1) = Imag[M(k-1)M^*(k-2)exp\{-jC(d_{k-2}, d_{k-1}, d_k)\}S^*_{k-1}S_{K-2}]$$

In an alternate embodiment, the demodulation performed in step 108 may be performed directly on M(k).

Figure 3:
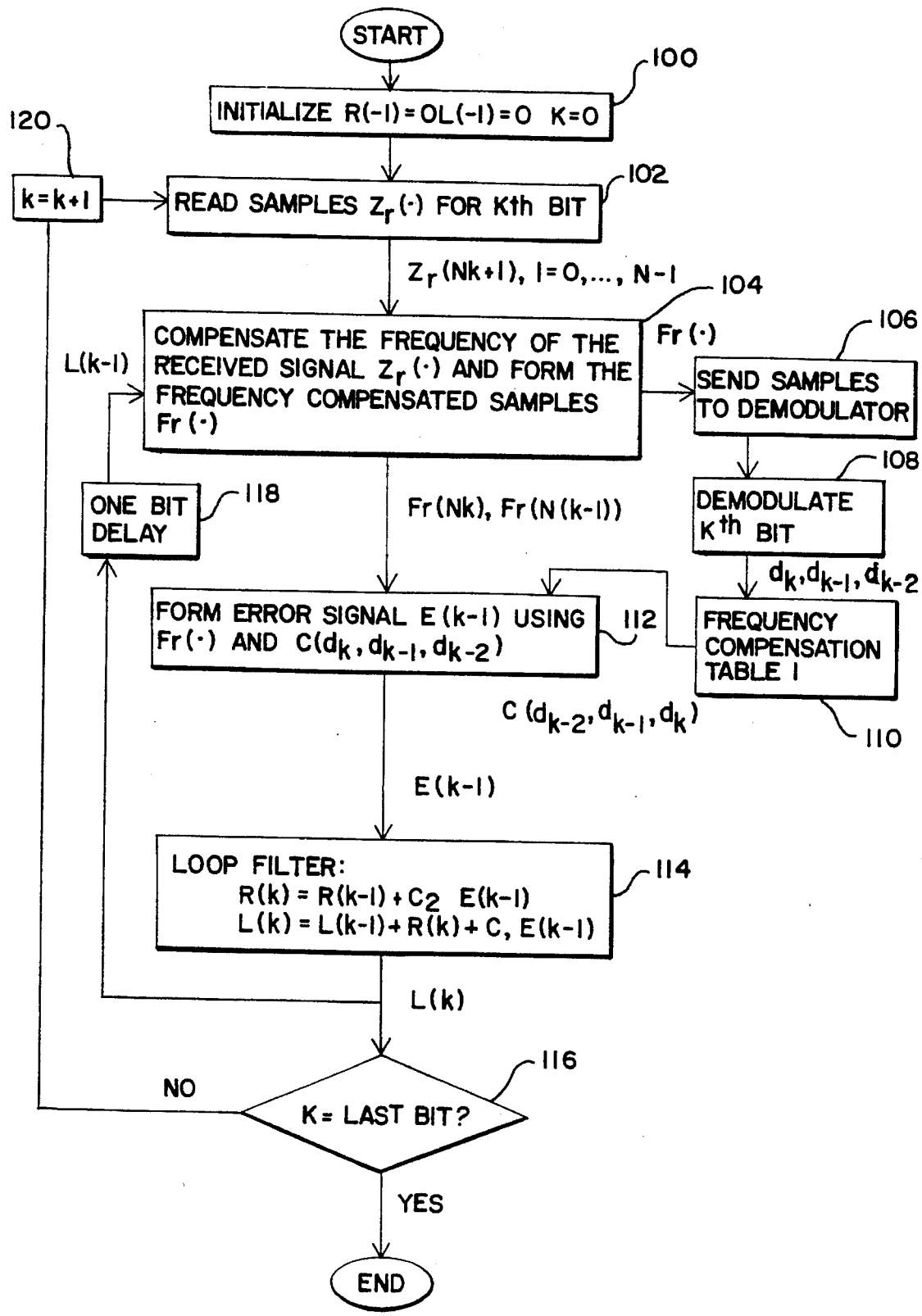
FIG. 3 is a flow chart, illustrating the operation of the AFC system of FIG. 2 according to a first preferred embodiment.
Figure 4:
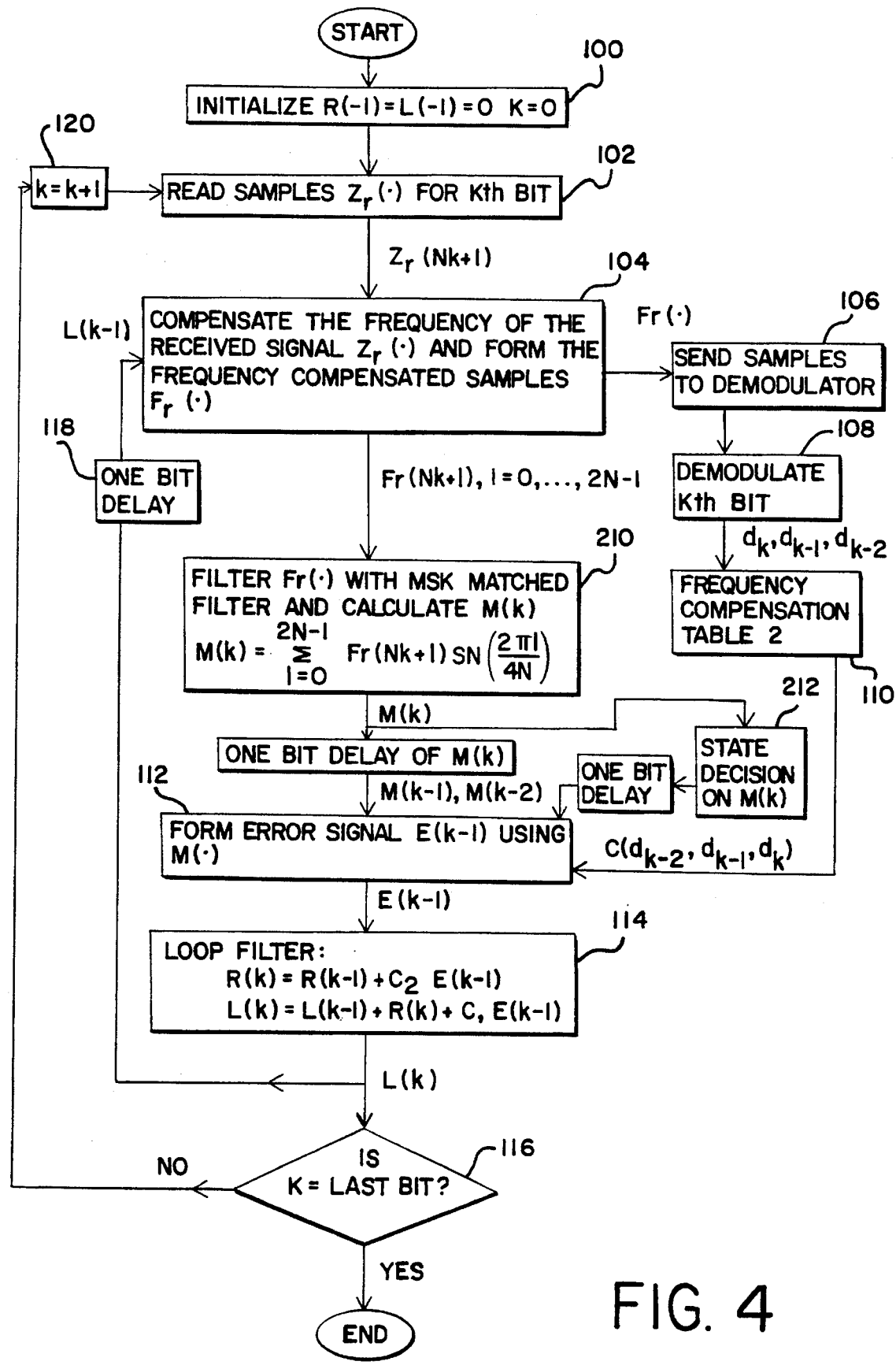
FIG. 4 is a flow chart illustrating the operation of the AFC system of FIG. 2 according to a second preferred embodiment of the present invention.

The remaining steps of the process are the same as already described with respect to the flow chart of FIG. 3.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

We claim:

1. A method of detecting and compensating for frequency drift in the carrier frequency of a Gaussian filtered Minimum Shift Keying (GMSK) signal comprising the steps of:

receiving samples of a bit of the GMSK signal;

computing frequency compensated samples from the samples of the GMSK signal using loop filter parameters;

demodulating the frequency compensated samples to provide a particular demodulated bit pattern;

computing a frequency compensation angle for the particular demodulated bit pattern;

computing an error signal from the frequency compensated samples calculated and the computed frequency compensation angle;

recalculating the loop filter parameters using the computed error signal; and looping back the recalculated loop filter parameters for use in computing further frequency compensated samples from further samples of the GMSK signal.

2. A method according to claim 1 wherein the step of computing frequency compensated samples is performed by multiplying the samples of the received GMSK signal with the loop filter parameters.

3. A method according to claim 2 wherein the step of computing a frequency compensation angle for a particular demodulated bit pattern is performed using the following look-up table:

| $d_{k-2}, d_{k-1}, d_k$ | $C(d_{k-2}, d_{k-1}, d_k)$ |
|---|---|
| 000 | −1.57 |
| 001 | −1.24 |
| 010 | 0.907 |
| 011 | 1.24 |
| 100 | −1.24 |
| 101 | −0.907 |
| 110 | 1.24 |
| 111 | 1.57 | where $d_k$, $d_{k-1}$, $d_{k-2}$ are the demodulated frequency compensated samples for the kth, (k-1)st and (k-2)nd bit respectively and $C(d_{k-2}, d_{k-1}, d_k)$ is the frequency compensated angle in radians.

4. A method according to claim 3 wherein the step of computing the error signal is performed by multiplying the frequency compensated samples with the frequency compensation angle.

5. A method according to claim 4 wherein the step of recalculating the parameter values of the loop filter is performed according to $$R(k)=R(k-1)+C_2E(k-1) \quad L(k)=L(k-1)+R(k)+C_1E(k-1),$$

where E(k-1) is the error signal for the previous bit; L(k) is the output of the loop filter; $C_1$ and $C_2$ are constants.

6. A method according to claim 1 further comprising the step of:
filtering the frequency compensated samples in a matched filter;
computing state decisions on the output of the matched filter; and
computing an error signal from the output of the matched filter and the state decisions.

7. A method according to claim 6 wherein the step of computing state decisions comprises applying:

$$S_k = \begin{cases} 1 & \text{if dist }(1,M(k)) < \text{dist}(-1,M(k)) \\ -1 & \text{otherwise} \end{cases}$$

for odd k, $$S_k = \begin{cases} -j & \text{if dist }(j,M(k)) < \text{dist}(-j,M(k)) \\ j & \text{otherwise} \end{cases}$$

where M(k) is the output of the matched filter and dist (a,b) measures the distance between a and b.

8. A method according to claim 1 wherein the step of computing a frequency compensation angle comprises using a compensation angle look up table.

9. A method according to claim 8 wherein the compensation angle look-up table comprises:

| $d_{k-2}, d_{k-1}, d_k$ | $c(d_{k-2}, d_{k-1}, d_k)$ |
|---|---|
| 000 | 0 |
| 001 | −0.63 |
| 010 | 1.26 |
| 011 | 0.63 |
| 100 | −0.63 |
| 101 | −1.26 |
| 110 | 0.63 |
| 111 | 0 | where $d_k$, $d_{k-1}$, $d_{k-2}$ are the demodulated frequency compensated samples for the kth, (k-1) st and (k-2) nd bit respectively and $C(d_{k-2}, d_{k-1}, d_k)$ is the frequency compensated angle.

10. A method according to claim 1 wherein the step of recalculating the loop filter parameters comprises combining a weighted value of the corresponding error signal with the loop filter parameters.

11. A method according to claim 1 wherein the step of computing the frequency compensated samples comprises applying:

$$F_r(Nk+1) = Z_r(Nk+1)\exp\left[-j\sum_{m=0}^{k-1}L(m)+L(k-1)\frac{l}{N}\right];$$

where l=0, ..., N−1, L(m) is the loop filter output for the nth bit, L(k-1) is the loop filter output for the (k-1) st bit, $Z_r$ (Nk+1) is the received samples of the GMSK signal for the Kth bit and $F_r$ (Nk+1) is the frequency compensated samples for the kth bit.

12. A method according to claim 1 wherein the step of computing an error signal comprises applying:

$$E(k-1)=\text{Imag}[F_r(Nk)F_r*N(k-1)exp\{-jC(d_{k-2}, d_{k-1}, d_k)\}].$$

13. An AFC system for detecting and compensating for frequency drift in the carrier frequency of a Gaussian filtered Minimum Shift Keying (GMSK) signal comprising:
an error detector and frequency compensator receiving samples of the GMSK signal and for computing an error signal and frequency compensated samples;
a loop filter receiving the output of the error detector and frequency compensator, the loop filter computing a filter parameter from the error signal and feeding back the filter parameter to the error detector and frequency compensator in a first feedback loop;
a demodulator receiving the output of the error detector and frequency compensator, the demodulator computing demodulated frequency compensated samples; and
a frequency compensation table receiving the demodulated frequency compensated samples and computing a frequency compensation angle and feeding back the frequency compensation angle to the error detector and frequency compensator in a second feed back loop;
wherein the error detector computes the error signal from the frequency compensated samples and the frequency compensation angle.

14. An AFC system according to claim 13 wherein the frequency compensator computes the frequency compensation samples according to $$F_r(Nk+1) = Z_r(Nk+1)\exp\left[-j\sum_{m=0}^{k-1}L(m)+L(k-1)\frac{l}{N}\right];$$

where l=0, ..., N−1, L(m) is the loop filter output for the nth bit, L(k-1) is the loop filter output for the (k-1)st bit, $Z_r$ (Nk+l) is the received samples of the GMSK signal for the Kth bit and $F_r$ (Nk+l) is the frequency compensated samples for the kth bit.

15. An AFC system according to claim 14 wherein the frequency compensation table has the following values:

| $d_{k-2}, d_{k-1}, d_k$ | $C(d_{k-2}, d_{k-1}, d_k)$ |
|---|---|
| 000 | −1.57 |
| 001 | −1.24 |
| 010 | 0.907 |
| 011 | 1.24 |
| 100 | −1.24 |
| 101 | −0.907 |
| 110 | 1.24 |
| 111 | 1.57 | where $d_k, d_{k-1}, d_{k-2}$ are the demodulated frequency compensated samples for the kth, (k-1)st and (k-2)nd bit respectively and $C(d_{k-2}, d_{k-1}, d_k)$ is the frequency compensated angle in radians.

16. An AFC system according to claim 15 wherein the error detector computes the error signal according to $$E(k-1)=Imag[F_r(Nk)F_r*N(k-1)exp\{-jC(d_{k-2},d_{k-1},d_k)\}].$$

17. An AFC system according to claim 16 wherein the loop filter computes the filter parameter L(k) according to $$R(k)=R(k-1)+C_2E(K-1) \quad L(k)=L(k-1)+R(k)+C_1E(K-1),$$

where $C_1$ and $C_2$ are constants.

18. An AFC system according to claim 13 further including:
a matched filter receiving the frequency compensated samples and calculating a matched filter output; and
a state decision maker receiving the matched filter output and computing state decisions;
wherein the error detector computes the error signal from the output of the matched filter and the frequency compensation angle.

19. An AFC system according to claim 18 wherein the frequency compensation table has the following values

| $d_{k-2}, d_{k-1}, d_k$ | $C(d_{k-2}, d_{k-1}, d_k)$ |
|---|---|
| 000 | 0 |
| 001 | −0.63 |
| 010 | 1.26 |
| 011 | 0.63 |
| 100 | −0.63 |
| 101 | −1.26 |
| 110 | 0.63 |
| 111 | 0 | where $d_k, d_{k-1}, d_{k-2}$ are the demodulated frequency compensated samples for the kth, (k-1)st and (k-2)nd bit respectively and $C(d_{k-2}, d_{k-1}, d_k)$ is the frequency compensated angle in radians.

20. An AFC system according to claim 18 wherein the error detector computes the error signal according to:

$$E(k-1)=Imag[M(k-1)M*(k-2)exp\{-jC(d_{k-2},d_{k-1},d_k)S*_{k-1}S_{k-2}\}]$$

where M(k-1) is the output of the matched filter for the (k-1)st bit, M* (k-2) is the complex conjugate of the output of the matched filter for the (k-2)nd bit, $S*_{k-1}$ is the complex conjugate of the state decision for the (k-1)st bit and $S_{k-2}$ is the state decision for the (k-2)nd bit.

21. An AFC system according to claim 18 wherein the state decision maker computes the state decisions according to $$S_k = \begin{cases} 1 & \text{if dist }(1,M(k)) < \text{dist}(-1,M(k)) \\ -1 & \text{otherwise} \end{cases}$$

for odd k, $$S_k = \begin{cases} -j & \text{if dist }(j,M(k)) < \text{dist}(-j,M(k)) \\ j & \text{otherwise} \end{cases};$$

where M(k) is the output of the matched filter and dist (a,b) measures the distance between a and b.

22. An AFC system according to claim 13 wherein the error detector and frequency compensator, the loop filter, and the demodulator and frequency compensation table are implemented with a digital signal processor.

23. An AFC system according to claim 13 wherein the demodulator computes demodulated frequency compensated samples by multiplying the samples of the received signal with the output of the loop filter block.

24. An AFC system according to claim 13 wherein the frequency compensation table includes the following values:

| $d_{k-2}, d_{k-1}, d_k$ | $c(d_{k-2}, d_{k-1}, d_k)$ |
|---|---|
| 000 | 0 |
| 001 | −0.63 |
| 010 | 1.26 |
| 011 | 0.63 |
| 100 | −0.63 |
| 101 | −1.26 |
| 110 | 0.63 |
| 111 | 0 | where $d_k, d_{k-1}, d_{k-2}$ are the demodulated frequency compensated samples for the kth, (k-1)st and (k-2)nd bit respectively and $C(d_{k-2}, d_{k-1}, d_k)$ is the frequency compensated angle.

25. An AFC system according to claim 13 wherein the loop filter recalculates filter parameters by combining a weighted value of the corresponding error signal with the loop filter parameters.

* * * * *